June 2, 1936.　　C. O. J. MONTELIUS　　2,042,725
APPARATUS FOR MEASURING LIQUIDS
Filed Oct. 12, 1932　　2 Sheets-Sheet 2
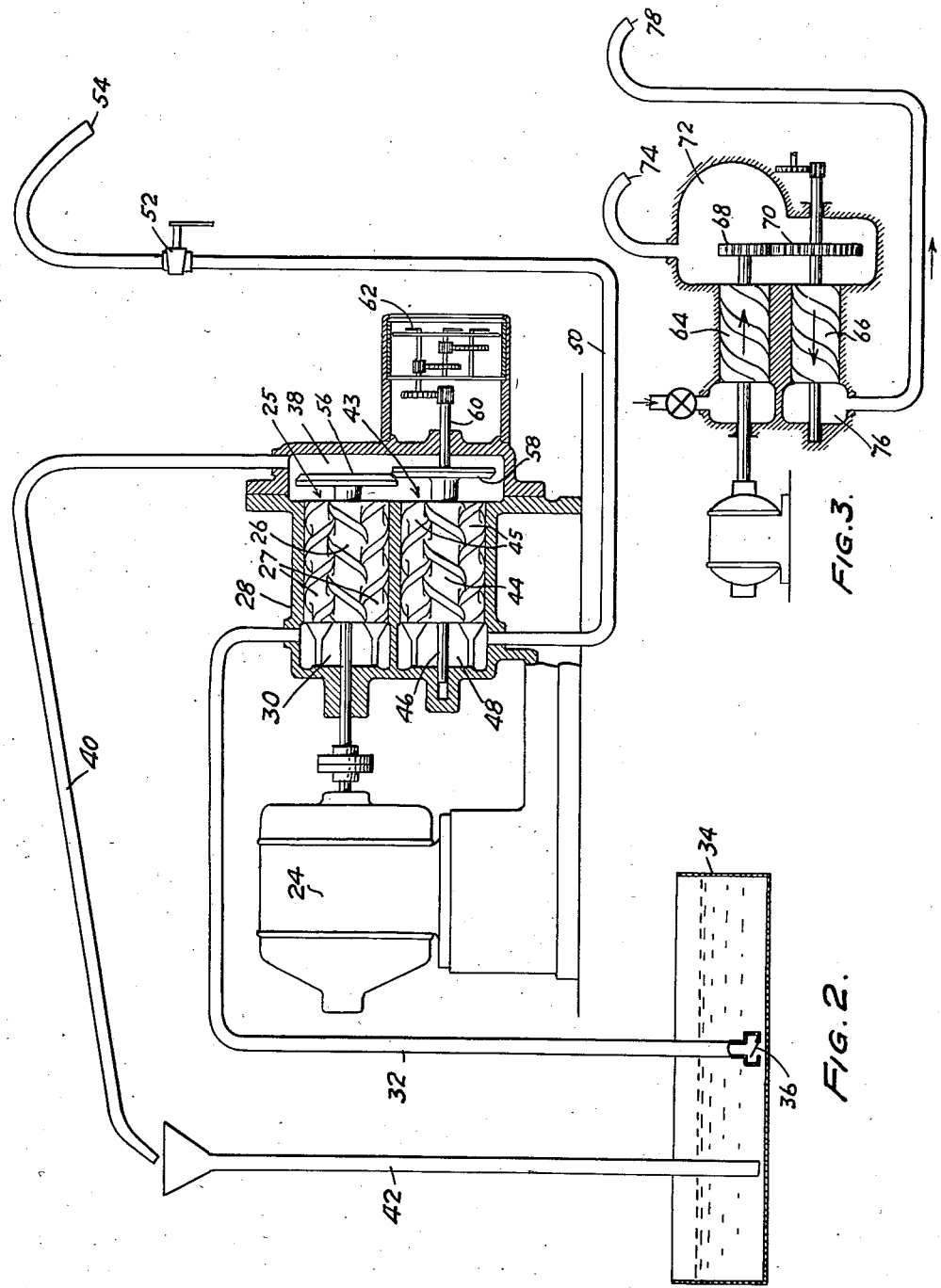
WITNESS:
INVENTOR
Carl Oscar Josef Montelius
BY
ATTORNEYS.

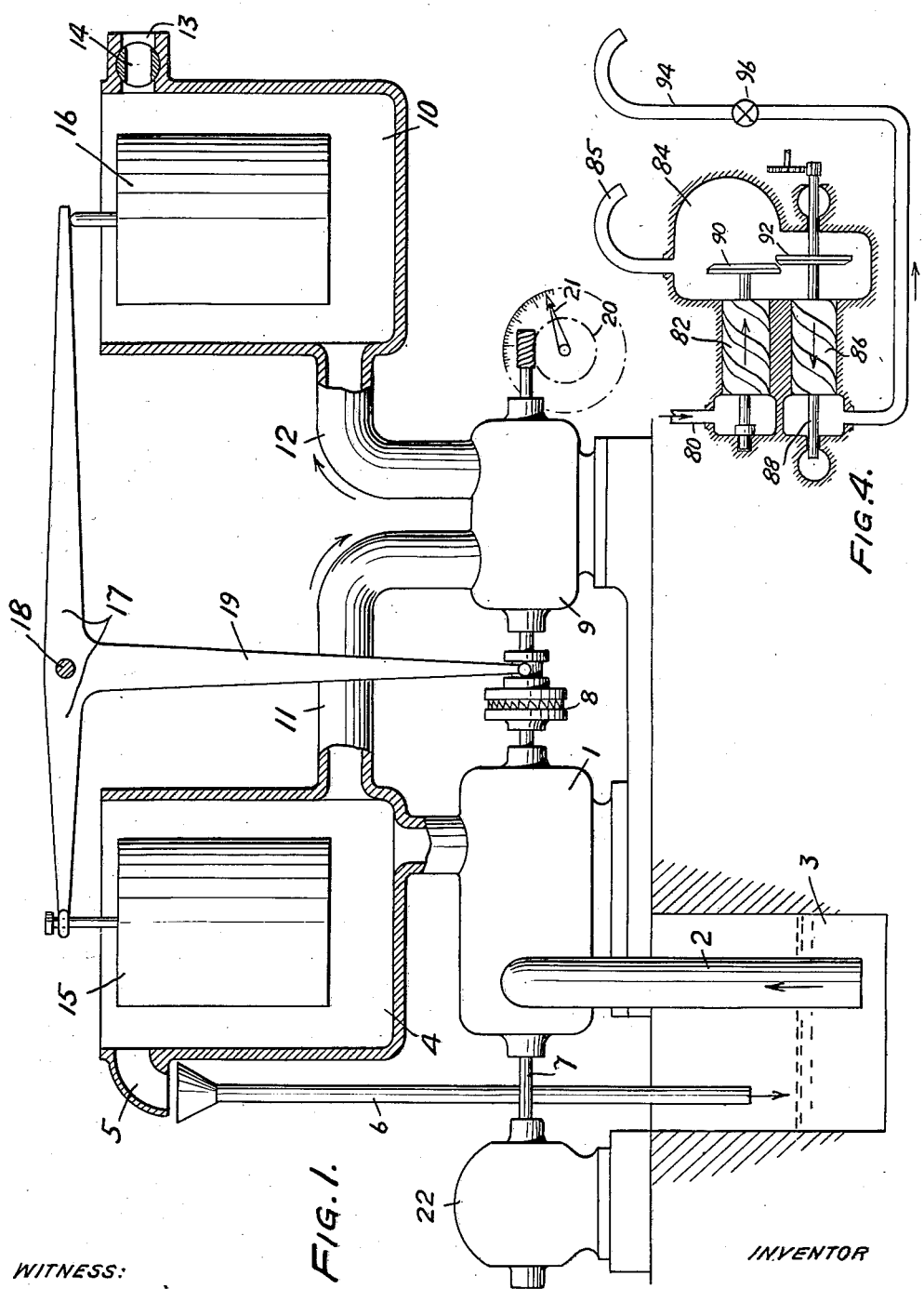

UNITED STATES PATENT OFFICE 2,042,725

APPARATUS FOR MEASURING LIQUIDS

Carl Oscar Josef Montelius, Stockholm, Sweden, assignor to Aktiebolaget Imo-Industri, Stockholm, Sweden, a corporation of Sweden Application October 12, 1932, Serial No. 637,379
In Sweden January 7, 1930

8 Claims. (Cl. 73—167)

I have filed an application in Sweden, January 7, 1930.

This invention relates to an apparatus for the measuring of flowing liquids and has particular reference to an apparatus for metering liquids with an accuracy which has not been heretofore attained.

Various types of measuring apparatus have been heretofore provided for the measuring and registration of quantities of liquids flowing through conduits. These may, in general, be divided into two types working on different principles; i. e. one type in which the liquid itself serves as a driving medium for the meter and registering device, and another where a pump serves at the same time as a meter and where, consequently, the registering device is driven mechanically from the same source of power which drives the pump.

In the first type, the liquid serving as a driving medium must overcome the frictional resistance in the meter and registering device which involves unsatisfactory results, in that the actual quantity of liquid flowing is greater than that indicated by the registering device due to leakage because of differences in pressure at the two sides of the device corresponding to the resistance encountered.

A similar difficulty is encountered in the other type of measuring apparatus, in that the leakage through the pump is considerable, owing to the great differences in pressure on both sides of the measuring pump. In the former case, the registering device indicates too low a value, and in the latter case too high a value.

The present invention has as its broad object effecting exact measuring and registration of pumped liquid, and the invention consists substantially in the combination with a suitably driven pump connected to a registering device, said pump having a constant or substantially constant volumetric displacement per revolution, of an arrangement for keeping the pressures on both sides of said pump at such values, preferably equal or substantially equal, that detrimental leakage through the pump is avoided. According to one embodiment of the invention, which is illustrative of the principles thereof, the measuring apparatus consists of a pump which is driven mechanically and is arranged between two vessels in which the surface of the liquid is kept approximately at the same level. The liquid is delivered to the first of these vessels through another pump or through a direct supply, while the liquid is permitted to flow off freely from the second vessel. The first mentioned pump, which serves for the measuring of the liquid, is connected directly to a registering device actuated by the speed of the pump. While this emobdiment will be first described, it is more complicated and less desirable than other embodiments later referred to.

Detailed objects of the invention, relating particularly to specific arrangements, will be apparent from the following description, read in conjunction with the accompanying drawings, in which:

Fig. 1 is a diagrammatic elevation, partly in section, of an illustrative embodiment of the invention;

Fig. 2 is a similar view of a preferred type of apparatus; and

Figs. 3 and 4 are diagrammatic illustrations of modifications of the apparatus of Fig. 2.

Referring first to Fig. 1, which serves to best illustrate the principle of the invention, a pump 1, through which extends the driving shaft 7, pumps liquid through an intake conduit 2 from a supply 3 and discharges into a vessel 4. An overflow 5, located at the top of the vessel, discharges into a conduit 6, which preferably empties into supply 3. By reason of this overflow, which is made of ample size, the surface of the liquid in the vessel 4 is prevented from rising above a certain level.

The shaft 7 in the embodiment illustrated carries one member of a clutch 8, the other member of which is connected to a shaft of a second pump 9. The clutch 8 may be of a toothed type, as illustrated, or may be of a friction type; the type illustrated being shown only for illustration. The pump 9 receives the liquid from the vessel 4 through a conduit 11 and discharges, through an outlet conduit 12, into a second vessel 10. This vessel is provided with an outlet 13 controlled by a valve indicated at 14, the outlet being preferably at the same height as the overflow 5. Accordingly, the liquid surfaces in the two vessels will have the same highest level.

Arranged in the vessel 4 is a float 15, while in the vessel 10 there is a second float 16, both of which are adapted to actuate a double armed lever 17, which is movable about a pivot 18 and actuates the clutch 8 by means of an arm 19 in such manner as to disengage the clutch elements as soon as the surface of the liquid in the vessel 4 falls below a certain level or the surface of the liquid in the vessel 10 rises above a certain level. The floats are so adjusted that the critical levels are substantially the discharge levels, so that the liquid heads on the inlet and outlet of the pump 9 are substantially the same, as will be hereafter made clearer.

The shaft of the pump 9 is connected through suitable gearing, as indicated at 20, to a pointer 21 adapted to indicate the movement of the pump 9 on a graduated scale. A counting mechanism or similar device may be added so that both revolutions and parts of revolutions of the shaft of the pump 9 may be indicated. The registering arrangement is shown diagrammatically, since, as will be obvious, any suitable type may be used: for example, the conventional, multiple dial arrangement of the ordinary water meter. Drive of the pumps is accomplished through a suitable motor, or the like, indicated at 22, connected to the drive shaft 7.

In the operation of the device, assuming that the vessel 4 is empty or insufficiently filled at the beginning of the pumping operation, the float 15 acts, through its weight, upon the lever 17 and thus disengages the clutch 8 so that, while the pump 1 is driven, the pump 9 is stationary. The operation of the pump 1 will fill up the vessel 4. When the level of the liquid in the vessel 4 has reached a height corresponding to the outlet 5 of this vessel, the clutch 8 is engaged and the pump 9 thereby set into operation to transfer liquid from the vessel 4 into the vessel 10. The pump 1 is preferably made of larger capacity than the pump 9, so that a quantity of liquid continuously flows off through the outlet 5 and the pipe conduit 6 back to the supply 3. On the other hand, the quantity of liquid transferred by the pump 9 into the vessel 10 flows off through the outlet 13. If it should happen that this outlet is closed by the valve 14, the level of the liquid in the vessel 10 will rise, whereupon the float 16 is raised and the lever 17 actuated thereby, so that the clutch is engaged and the pump 9 brought to a standstill.

The advantages of the arrangement are found in that the measuring may take place exactly and independently both of the friction in the measuring apparatus and in the registering elements, while leakage is avoided in the pump 9, due to the fact that the heads at the inlet and discharge of this pump are maintained equal during the operation. The measuring apparatus is driven mechanically but does not do any work upon the delivered liquid. It is true that a small leakage may occur in the pump 9, especially at high speeds of operation, even if the liquid levels in the vessels 4 and 10 are the same. The reason for this is the fall of pressure produced by the velocity of the liquid through the pump and the conduits 11 and 12. To compensate for this fall of pressure, which may be kept low by not driving the pump 9 at too great a speed, the outlet 5 is preferably dimensioned so as to be smaller than the outlet 13. Due to the fact that the capacity of the pump 1 is larger than that of the pump 9, a certain quantity of liquid will continually flow off through the outlet 5, this quantity of liquid being increased at an augmented speed of the pump. It is thus possible, at a higher speed of the pump, to obtain a higher liquid level in the vessel 4 than in the vessel 10 and to adapt this difference in the levels so that it corresponds to differences in pressure in the pump 9 which would occur due to the velocity of flow. By this arrangement every reason for leakage in the pump 9 can be avoided, so that this pump will always measure exactly the same quantity of liquid per revolution independently of the pump speed.

The measuring pump 9 must, of course, be of such type as to always deliver a certain quantity of liquids per revolution independently of the speed and with a leakage as small as possible. For example, this pump may be of the piston, gear, wheel, screw or flap valve type, or the like. Preferably the pump is of the type illustrated and described in my prior Patents Nos. 1,698,802 and 1,821,523 issued, respectively, January 15, 1929 and September 1, 1931. By the use of these pumps, which are of a positive displacement type, not only can high speeds of operation be attained, but leakage minimized at these high speeds, notwithstanding relatively large differences in pressure between the inlet and outlet. With the use of a pump of this character, for example, it is feasible to disregard entirely such pressure variations as may arise due to high speeds of operation, while there will still be obtained an accurate indication of the quantity delivered.

In the preferred embodiment of the invention, illustrated in Fig. 2, advantage is taken of a property of the screw type of pump described in my patents referred to above, namely, that one screw may drive another or others directly without the use of additional gearing. Under such circumstances, the angular relationship of the screws and their relative axial positions are dependent upon each other: that is, one screw may move freely axially relatively to the other, with a corresponding angular displacement, without disturbance of the operative relationship of the screws.

A motor 24 drives the driving screw 26 of a set of screws of the type indicated, which driving screw 26 in turn drives directly one or more driven screws 27, the screws being mounted in a casing 28. The primary pump 25 formed by the set of screws receives liquid from a chamber 30 communicating with a supply 34 through a pipe 32 provided with an upwardly opening check valve 36. Pump 25 discharges into a chamber 38 communicating with an overflow 40 discharging into a conduit 42 which returns liquid to the supply.

A second pump 43, the measuring pump, having the same capacity as the pump 25, and comprising a driving screw 44 and driven screws 45, receives the liquid from the chamber 38 and discharges into the chamber 48 from which the liquid flows through a conduit 50, valved at 52 and discharging at 54. The shaft 46 of the driving screw 44 of the pump 43 is axially slidable in the casing and carries a friction disc 58 adapted to be moved into or out of driving connection with a disc 56 carried by the driving screw of the pump 25, by axial movement of shaft 46. An extension 60 of shaft 46 serves to drive the indicating mechanism 62. The discs 56 and 58 provide a convenient form of clutch.

The apparatus is so designed that part of the liquid and, if the liquid contains air, all of the air escapes through 40. During the operation, if the discs 58 and 56 are not initially engaged, the pressure in 38 will slightly exceed the pressure in 48 with the result that the axially movable driving screw 44 is displaced slightly to the left causing engagement of the friction discs. The pump 43 is then positively driven. As a part of the liquid escapes by the overflow 40, there will arise a tendency of the pump 43 to pump more liquid than is delivered to it. The preponderance of pressure on the left hand side resulting from this action will move the screw 44 to the right thereby disengaging the discs 56 and 58. The arrangement illustrated is extremely sensitive to slight difference of pressure since the screw 44 is horizontal and rotating and being lubricated by the liquid pumped, and accordingly the clutch is very sensitive and maintains the pressures on the two sides of the pump substantially equal at all times. It will be obvious that this condition will exist even though there is considerable variation in flow through 50 due, for example, to control by the valve 52; for if the pressure in 48 rises there will be immediately a corresponding rise in 38 accompanied by increased overflow. The arrangement is such that the clutch member 56 is continuously driven at a rate approximating the average speed required by the clutch member 58 to enable the pump to handle the liquid.

If no overflow is provided, restriction of flow through 50 may result in an unusual load upon pump 25, but nevertheless the operation of the measuring pump is unchanged. In such cases it is desirable to arrange the clutch so that the measuring pump is driven slightly faster than the primary pump whereby some slipping of the clutch will occur. The clutch members need not, of course, be within the chamber 38.

Numerous variations in apparatus embodying the principles of the invention may be made. For example one such variation is illustrated in Fig. 3 in which a pump, conventionally illustrated at 64, drives a measuring pump 66 through gearing 68 and 70, the pump 66 being driven slower or having less capacity than pump 64. Passage from the first pump to the second is provided by a chamber 72 having an overflow 74 while discharge from the receiving chamber 76 takes place at 78 at the same level as 74. The same pressure is obviously maintained on both sides of the pump 66. Passage through the discharge must, of course, be free.

In Fig. 2, the motor driving the primary pump is used to drive the clutch member 56 with which the clutch member controlled by the measuring pump engages. This is obviously only a matter of convenience since an independent motor may be used entirely unrelated to the rate of flow, except in that its speed must exceed a certain minimum. To avoid excessive clutch slippage, however, it is desirable that the driving motor for the measuring pump should, with the clutch engaged the greater part of the time, drive the pump at the proper speed to take care of the flow. Fig. 4 illustrates one method of accomplishing this result.

In Fig. 4, inflowing liquid, flowing from a pump or any other source, enters at 80 to drive a hydraulic motor 82 which may be of the form illustrated in my said prior patents and is so shown conventionally. This motor drives, through clutch members 90 and 92, the measuring pump 86 which receives the discharge from the hydraulic motor at 84 and in turn discharges through the conduit 94 provided with a valve 96, some overflow occurring through 85. As in the arrangement of Fig. 2, the clutch member 92 is carried by the sliding shaft 88 of the driving screw of the motor 86. The speed of motor 82 varies with the inflow at 80 maintaining the speed of disc 90 approximately that desired for substantially continuous driving engagement with disc 92. The operation is fundamentally identical with that involved in the apparatus of Fig. 2.

Obviously variations of the arrangement of Fig. 4 are possible, such as the elimination of the overflow or the use of gearing in a manner corresponding to Fig. 3. While a conventional clutch is shown this clutch may be of other types controlled in suitable fashion.

The term "pump" as applied to the measuring device is to be understood in a broad sense inasmuch as under certain conditions the measuring device is acting effectively as a motor, there being a greater pressure at the intake than at the discharge. Under idle conditions it is effectively functioning neither as a pump nor as a motor inasmuch as no work is being done by or upon it.

It will be obvious that variations of this type and others may be made without departing from the spirit of the invention as defined in the following claims.

What I claim and desire to protect by Letters Patent is:

1. In combination, a screw pump of positive displacement type including a screw axially movable in response to differences in pressure at the intake and discharge, means for indicating the operations of the pump, means providing a liquid supply for the pump, driving means, and means whereby driving of the pump by said means is controlled by axial movements of said screw.

2. In combination, a screw pump of positive displacement type including a screw axially movable in response to differences in pressure at the intake and discharge, means for indicating the operations of the pump, means providing a liquid supply for the pump, driving means, and means whereby driving of the pump by said means is controlled by axial movements of said screw, said means including a clutch member continuously driven by the driving means, and a second clutch member engageable with or disengageable from the first by the axial movements of the screw.

3. In combination, a screw pump of positive displacement type including a screw axially movable in response to differences in pressure at the intake and discharge, means for indicating the operations of the pump, means providing a liquid supply for the pump, driving means, and means whereby driving of the pump by said means is controlled by axial movements of said screw, said means including a clutch member continuously driven by the driving means, and a second clutch member engageable with or disengageable from the first by the axial movements of the screw, the first clutch member being driven at a rate approximating the average speed required by the second clutch member to enable the pump to handle the liquid.

4. In combination, a measuring pump of positive displacement type, means for indicating the operations of the pump, a main pump, connections between the main and measuring pumps whereby the former delivers liquid to the latter including a vessel provided with an overflow whereby a maximum level of liquid therein is substantially determined, discharge connections from the measuring pump including a second vessel provided with an outflow whereby a maximum level of liquid therein is substantially determined, driving means for the measuring pump, and means whereby driving of the measuring pump is automatically effected only when the surfaces of liquid in the two vessels are at substantially the same level.

5. In combination, a measuring pump of positive displacement type, means for indicating the operations of the pump, a main pump, connections between the main and measuring pumps whereby the former delivers liquid to the latter including a vessel provided with an overflow whereby a maximum level of liquid therein is substantially determined, discharge connections from the measuring pump including a second vessel provided with an outflow whereby a maximum level of liquid therein is substantially determined, driving means for the measuring pump, and means whereby driving of the measuring pump is effected only when the surfaces of liquid in the two vessels are at substantially the same level, said last means being controlled by floats in the vessels.

6. In combination, a pump of positive displacement type, means for indicating the operations of the pump, means providing a liquid supply for the pump, driving means for the pump, means for diverting excess liquid at the intake side of the pump in such quantities as to maintain substantially equal the pressures at its intake and discharge, and means responsive to said pressures controlling the driving means to effect driving of the pump only when said pressures are substantially equal.

7. In combination, a pump of positive displacement type, means for indicating the operations of the pump, means providing a supply of liquid for the pump, driving means for the pump, a clutch between the driving means and the pump, means operating independently of the speed of operation of the pump to maintain the pressure at the discharge side of the pump not substantially less than the pressure at its intake side, and means whereby the clutch is automatically engaged only when the pressure at the discharge side of the pump does not substantially exceed the pressure at its intake side.

8. In combination, a measuring pump of positive displacement type, means for indicating the operations of the pump, a main pump, means through which the main pump delivers liquid to the measuring pump, driving means for the measuring pump, clutch means between the driving means and the measuring pump, engagement of said clutch means being controlled by the pressures at the intake and discharge of the measuring pump whereby driving of the measuring pump is automatically effected only when the pressures at the intake and discharge thereof are substantially equal, said main pump having a greater discharge rate than the measuring pump, and means for diverting from the measuring pump the excess discharge of the main pump.

CARL OSCAR JOSEF MONTELIUS.